(12) United States Patent
Moynihan et al.

(10) Patent No.: US 9,832,548 B2
(45) Date of Patent: Nov. 28, 2017

(54) FLEXIBLE BEHAVIOR MODIFICATION DURING RESTORATION IN OPTICAL NETWORKS

(71) Applicant: Ciena Corporation, Hanover, MD (US)

(72) Inventors: Jeffrey Scott Moynihan, Cumming, GA (US); Gerard Leo Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 9 days.

(21) Appl. No.: 15/010,684

(22) Filed: Jan. 29, 2016

(65) Prior Publication Data

US 2017/0223436 A1 Aug. 3, 2017

(51) Int. Cl.
*H04Q 11/00* (2006.01)
*H04L 12/723* (2013.01)

(52) U.S. Cl.
CPC ......... *H04Q 11/0003* (2013.01); *H04L 45/50* (2013.01)

(58) Field of Classification Search
CPC ... H04B 10/116; H04B 10/27; H04Q 11/0003
See application file for complete search history.

(56) References Cited

U.S. PATENT DOCUMENTS

| | | | |
|---|---|---|---|
| 8,259,733 B2 | 9/2012 | Conklin et al. |
| 8,356,233 B2 | 1/2013 | Nichols et al. |
| 8,402,121 B2 | 3/2013 | Skalecki et al. |
| 8,417,111 B2 | 4/2013 | Moynihan et al. |
| 8,509,055 B2 | 8/2013 | Khan et al. |
| 8,509,621 B2 | 8/2013 | Boertjes et al. |
| 8,553,707 B2 | 10/2013 | Swinkels et al. |
| 8,559,812 B2 | 10/2013 | Ottman et al. |
| 8,699,346 B2 | 4/2014 | Madrahalli et al. |
| 8,817,824 B2 | 8/2014 | Connolly et al. |
| 8,854,955 B2 | 10/2014 | Prakash et al. |
| 2009/0175618 A1 | 7/2009 | Yan |
| (Continued) | | |

FOREIGN PATENT DOCUMENTS

EP 1981221 A1 10/2008

OTHER PUBLICATIONS

Traffic Engineering Extensions to OSPF for Generalized MPLS (GMPLS); Control of Evolving G.709 OTN Networks; CCAMP Working Group; Internet-Draft; Ceccarelli, et al.; Copyright (c) 2013 IETF Trust; Expires Jun. 14, 2014.

(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods of flexible behavior modification of a service implemented in a node during restoration in an optical network include provisioning the service on a home route with a first set of attributes; defining one or more protect routes in the network for the service, wherein each of the one or more protect routes have a corresponding set of attributes which differs from the first set of attributes; and, responsive to restoration of the service, determining a protect route of the one or more protect routes to restore the service and changing the service to have the corresponding set of attributes while on the protect route.

20 Claims, 6 Drawing Sheets

(56) References Cited

U.S. PATENT DOCUMENTS

| | | | |
|---|---|---|---|
| 2009/0304380 A1* | 12/2009 | Sadananda | H04Q 11/0062 398/26 |
| 2010/0104282 A1* | 4/2010 | Khan | H04J 3/14 398/45 |
| 2010/0172236 A1* | 7/2010 | Madrahalli | H04J 3/14 370/225 |
| 2011/0222394 A1 | 9/2011 | Swinkels et al. | |
| 2011/0222862 A1 | 9/2011 | Boertjes et al. | |
| 2013/0114416 A1 | 5/2013 | Rao et al. | |
| 2013/0114953 A1 | 5/2013 | Moynihan et al. | |
| 2013/0242721 A1 | 9/2013 | Moynihan et al. | |
| 2013/0272318 A1 | 10/2013 | Swinkels et al. | |
| 2013/0308948 A1 | 11/2013 | Swinkels et al. | |
| 2014/0147107 A1 | 5/2014 | Swinkels et al. | |
| 2014/0169791 A1 | 6/2014 | Swinkels et al. | |
| 2014/0314402 A1 | 10/2014 | Moynihan et al. | |
| 2014/0314409 A1 | 10/2014 | Swinkels et al. | |
| 2015/0003448 A1 | 1/2015 | Swinkels et al. | |
| 2015/0023368 A1 | 1/2015 | Connolly et al. | |
| 2015/0117850 A1* | 4/2015 | Prakash | H04B 10/032 398/2 |

OTHER PUBLICATIONS

Generalized Multi-Protocol Label Switching (GMPLS) Architecture; Network Working Group E. Mannie, Ed.; (C) The Internet Society (2004); Oct. 2004.

International Telecommunication Union; ITU-T G.7713.2/Y.1704.2; Telecommunication Standardization Sector of ITU; Series G: Transmission Systems and Media, Digital Systems and Networks; Digital terminal equipments—Operations, administration and maintenance features of transmission equipment; Series Y: Global Information Infrastructure and Internet Protocol Aspects; Internet protocol aspects—Operation, administration and maintenance; Mar. 2003.

International Telecommunication Union; ITU-T G.8080/Y.1304; Telecommunication Standardization Sector of ITU; Series G: Transmission Systems and Media, Digital Systems and Networks; Packet over Transport aspects—Ethernet over Transport aspects; Series Y: Global Information; Infrastructure, Internet Protocol Aspects and Next-Generation Networks; Internet protocol aspects—Transport; Feb. 2012.

* cited by examiner

FLEXIBLE BEHAVIOR MODIFICATION DURING RESTORATION IN OPTICAL NETWORKS

FIELD OF THE DISCLOSURE

The present disclosure generally relates to optical networking systems and methods. More particularly, the present disclosure relates to flexible behavior modification during restoration in optical networks, such as at Layer 0 (photonic), Layer 1 (Time Division Multiplexing), Layer 2/3 (packet), or a combination thereof.

BACKGROUND OF THE DISCLOSURE

Optical networks and the like (e.g., Dense Wave Division Multiplexing (DWDM), Synchronous Optical Network (SONET), Synchronous Digital Hierarchy (SDH), Optical Transport Network (OTN), Ethernet, and the like) at various layers are deploying control plane systems and methods. Control planes provide an automatic allocation of network resources in an end-to-end manner. Exemplary control planes may include Automatically Switched Optical Network (ASON) as defined in ITU-T G.8080/ Y.1304, Architecture for the automatically switched optical network (ASON) (Feb. 2005), the contents of which are herein incorporated by reference; Generalized Multi-Protocol Label Switching (GMPLS) Architecture as defined in IETF Request for Comments (RFC): 3945 (Oct. 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services in the control plane. Also, note the aforementioned control planes are circuit-based control planes, e.g., operating at Layer 1 (Time Division Multiplexing (TDM)) and/or Dense Wavelength Division Multiplexing (DWDM) Layer 0 (wavelengths). Control planes use the available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

One aspect of control planes, SDN, and hybrid control is service restoration, such as in response to faults, a new path is established separately from the fault. In a control plane, the service can be controlled and restored by its originating network element. In SDN, the service can be controlled and restored by the SDN controller, and in the hybrid control, the service can be controlled by the control plane which is provided a new path by the SDN controller. Conventionally, a service's behavior cannot be changed or altered during restoration. That is, a service is restored with the same attributes the service has on its home path (i.e., the path the service is originally routed on). Also, conventionally, many attributes require the service to be in an out-of-service state to alter the behavior, and all attribute changes are permanent. By not allowing the attributes of a service to be altered during restoration, the network may not be able to restore the service.

BRIEF SUMMARY OF THE DISCLOSURE

In an exemplary embodiment, a method of flexible behavior modification of a service implemented in a node during restoration in an optical network includes provisioning the service on a home route with a first set of attributes; defining one or more protect routes in the network for the service, wherein each of the one or more protect routes have a corresponding set of attributes which differs from the first set of attributes; and responsive to restoration of the service, determining a protect route of the one or more protect routes to restore the service and changing the service to have the corresponding set of attributes while on the protect route. The service can be a Subnetwork Connection (SNC) and the home route and the one or more protect routes can be defined by Designated Transit Lists (DTLs) provided by one or more of a user, a Network Management System (NMS), and a Software Defined Networking (SDN) application. The service can be a Labeled Switched Path (LSP) and the home route and the one or more protect routes are defined by Explicit Route Objects (EROS) provided by one or more of a user, a Network Management System (NMS), and a Software Defined Networking (SDN) application. The determining can be based on a state of the service and the network at a time of the restoration. The changing the service can alter attributes across an entire path of the protect route. The changing the service can alter attributes across one or more links of the protect route. The service can be a Layer 1 service, and wherein the attributes can include one or more of preemption priority, Optical Virtual Private Network (OVPN) domains, latency, a destination endpoint, administrative weight, and route diversity. The service can be a packet service, and wherein the attributes can include one or more of Multiprotocol Label Switching Transport Profile (MPLS-TP) Label Switched Path (LSP) attributes including size and priority. The service can be an optical connection, and wherein the one or more attributes can include one or more of a modulation format, a rate, and a spectral width for the optical connection.

In another exemplary embodiment, an apparatus adapted to perform flexible behavior modification of a service during restoration in an optical network includes circuitry adapted to provision the service on a home route with a first set of attributes; circuitry adapted to define one or more protect routes in the network for the service, wherein each of the one or more protect routes have a corresponding set of attributes which differs from the first set of attributes; and circuitry adapted to determine, responsive to restoration of the service, a protect route of the one or more protect routes to restore the service and adapted to change the service to have the corresponding set of attributes while on the protect route. The service can be a Subnetwork Connection (SNC) and the home route and the one or more protect routes can be defined by Designated Transit Lists (DTLs) provided by one or more of a user, a Network Management System (NMS), and a Software Defined Networking (SDN) application. The service can be a Labeled Switched Path (LSP) and the home route and the one or more protect routes can be defined by Explicit Route Objects (EROS) provided by one or more of a user, a Network Management System (NMS), and a Software Defined Networking (SDN) application. The circuitry adapted to determine can use a state of the service and the network at a time of the restoration. The change can alter attributes across an entire path of the protect route. The change can alter attributes across one or more links of the protect route. The service can be a Layer 1 service, and wherein the attributes can include one or more of preemption priority, Optical Virtual Private Network (OVPN) domains, latency, a destination endpoint, administrative weight, and route diversity. The service can be a packet service, and wherein the attributes can include one or more of Multiprotocol Label Switching Transport Profile (MPLS-TP) Label Switched Path (LSP) attributes including size and priority. The service can be an optical connection, and wherein the one or more attributes can include one or more of a modulation format, a rate, and a spectral width for the optical connection.

In a further exemplary embodiment, a node in an optical network adapted to perform flexible behavior modification of a service during restoration includes one or more line ports adapted to ingress and egress a service; and a controller adapted to provision the service on a home route with a first set of attributes, define one or more protect routes in the network for the service, wherein each of the one or more protect routes have a corresponding set of attributes which differs from the first set of attributes, and, responsive to restoration of the service, determine a protect route of the one or more protect routes to restore the service and change the service to have the corresponding set of attributes while on the protect route. The controller can be adapted to determine and use a state of the service and the network at a time of the restoration.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, flexible behavior modification systems and methods are described for restoration in optical networks. The systems and methods add attributes to a Designated Transit List (DTL) or an Explicit Route Object (ERO), allowing a service's behavior to be changed during a restoration action. This behavior change can also be combined with a Network Planning Application and/or a SDN Application with visibility of the entire network. The systems and methods enable flexibility in the network and services during periods of network failure allowing the maximum number of services to be restored. This flexibility increases the network utilization and reliability. As described herein, a service can be an SNC, an LSP, a TDM connection (e.g., OTN), an optical connection (e.g., DWDM), or a combination thereof, i.e., any connection managed by a control plane, SDN, or the like.

Exemplary Network

Figure 1:
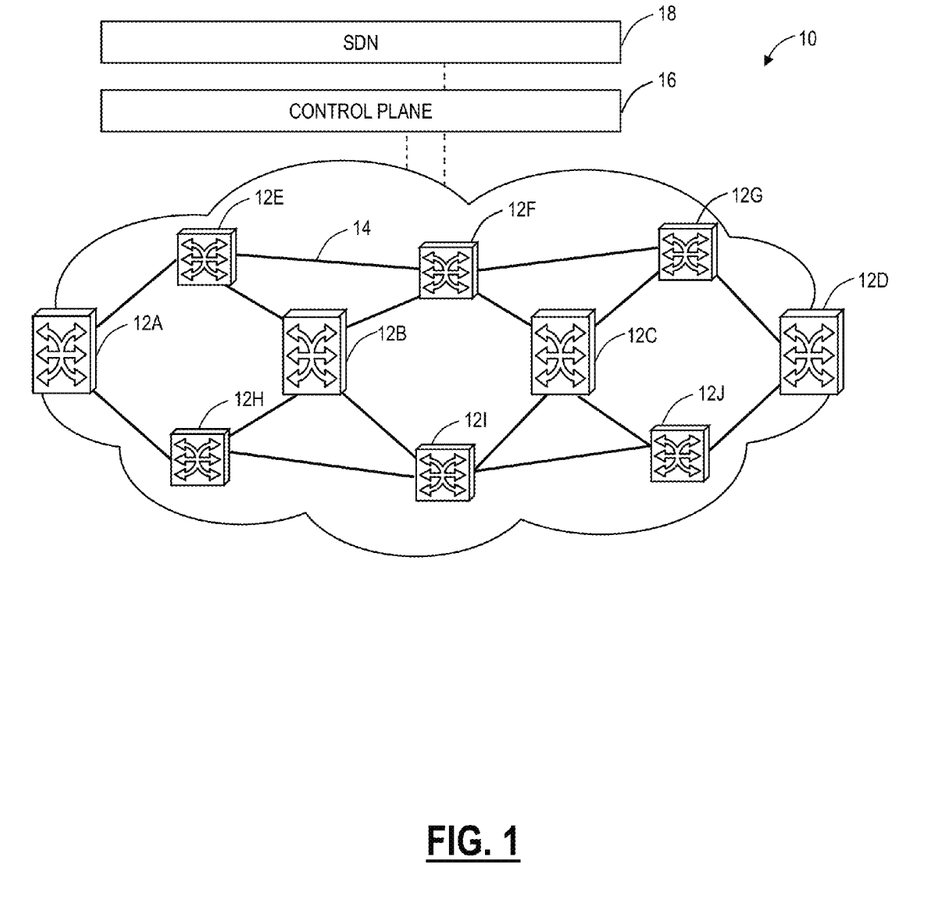
FIG. 1 is a network diagram of an exemplary network with various interconnected nodes.
Figure 2:
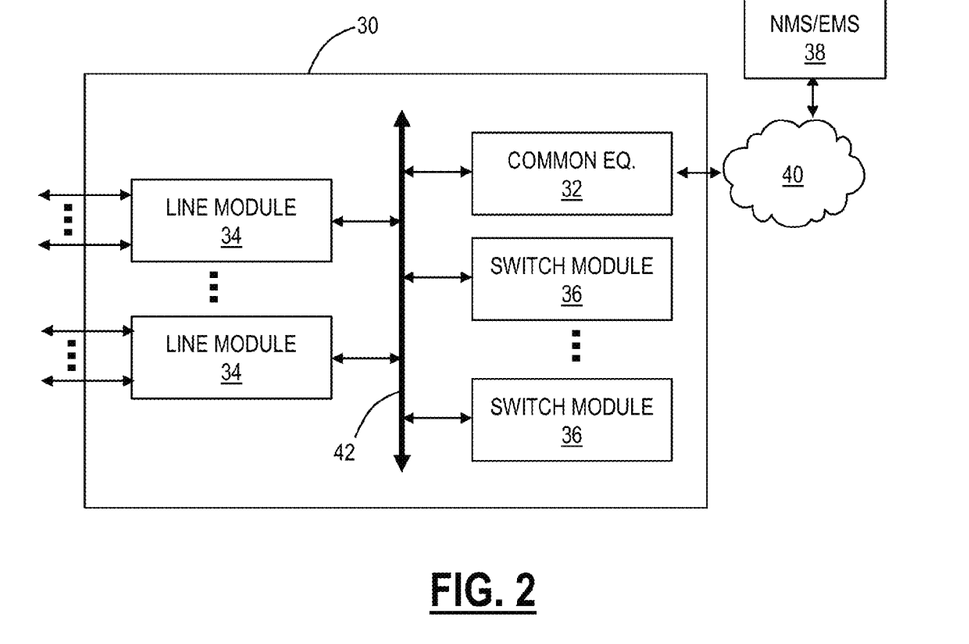
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J). The nodes 12 are interconnected through a plurality of links 14. The nodes 12 communicate with one another over the links 14 through Layer 0 (L0), Layer 1 (L1), Layer 2 (L2), and/or Layer 3 (L3) protocols. The nodes 12 can be network elements which include a plurality of ingress and egress ports forming the links 12. An exemplary node implementation is illustrated in FIG. 2. The network 10 can include various services between the nodes 12. Each service can be at any of the L0, L1, L2, and/or L3 protocols, such as a wavelength, an SNC, an LSP, etc., and each service is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 100 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for connections; network level protection and restoration; and the like. In an exemplary embodiment, the control plane 16 can utilize ASON, GMPLS, OSRP, MPLS, Open Shortest Path First (OSPF), Intermediate System-Intermediate System (IS-IS), or the like. Those of ordinary skill in the art will recognize the network 10 and the control plane 16 can utilize any type of control plane for controlling the nodes 12 and establishing connections between the nodes 12.

An SDN controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Alternatively, the network 10 can use the SDN controller 18 separately from the control plane 16. In another exemplary embodiment, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18.

In the terminology of ASON and OSRP, sub-network connections (SNC) are end-to-end signaled paths since from the point of view of a client signal, each is a single network segment. In GMPLS, the connections are an end-to-end path referred to as LSPs. For example, LSPs for GMPLS are described in draft-ietf-ccamp-gmpls-ospf-g709v3-13,"Traffic Engineering Extensions to OSPF for Generalized MPLS (GMPLS) Control of Evolving G.709 OTN Networks," (Dec. 11, 2013), the contents of which are incorporated by reference herein. In SDN, such as in OpenFlow, services are called "flows." In the various descriptions herein, reference is made to SNCs for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

Figure 3:
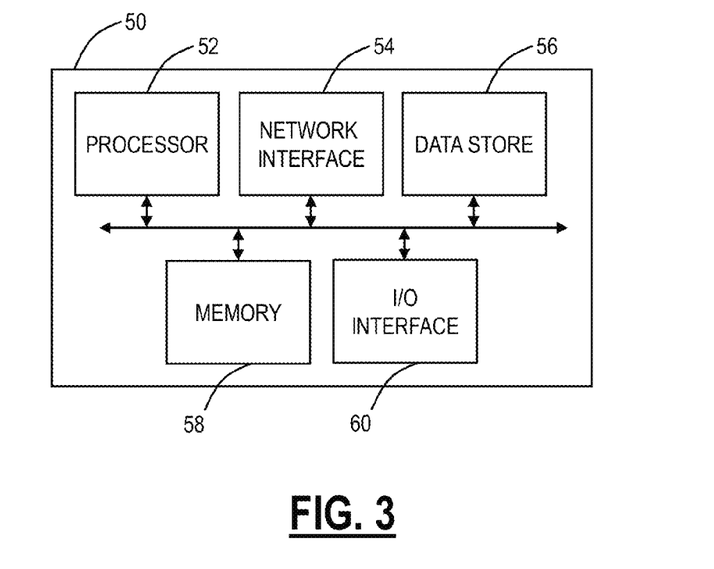
FIG. 3 is a block diagram of a controller to provide control plane processing and/or operations, administration, maintenance, and provisioning (OAM&P) for the node of FIG. 2, and/or to implement a Software Defined Networking (SDN) controller.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), Software Defined Network (SDN) controller, OpenFlow controller, etc.). The management system 38 can include a network management system (NMS), element management system (EMS), or the like. Additionally, the common equipment 32 can include a control plane processor, such as a controller 50 illustrated in FIG. 16 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N=1.25 GB/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 100. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

In an exemplary embodiment, the node 30 in the optical network 10 is adapted to perform flexible behavior modification of a service during restoration. The node 30 includes one or more line ports adapted to ingress and egress a service, on the line module 34; and the controller 50 adapted to provision the service on a home route with a first set of attributes, define one or more protect routes in the network for the service, wherein each of the one or more protect routes have a corresponding set of attributes which differs from the first set of attributes, and, responsive to restoration of the service, determine a protect route of the one or more protect routes to restore the service and change the service to have the corresponding set of attributes while on the protect route. Optionally, the service can be a Subnetwork Connection (SNC) and the home route and the one or more protect routes are defined by Designated Transit Lists (DTLs) provided by one or more of a user, a Network Management System (NMS), and a Software Defined Networking (SDN) application. Alternatively, the service can be a Labeled Switched Path (LSP) and the home route and the one or more protect routes are defined by Explicit Route Objects (EROs) provided by one or more of a user, a Network Management System (NMS), and a Software Defined Networking (SDN) application. The controller 50 can be adapted to determine and use a state of the service and the network at a time of the restoration.

Exemplary Controller

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and with the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10BaseT, Fast Ethernet, Gigabit Ethernet) or a wireless local area network (WLAN) card (e.g., 802.11). The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

Flexible Behavior Modification Process

Figure 4:
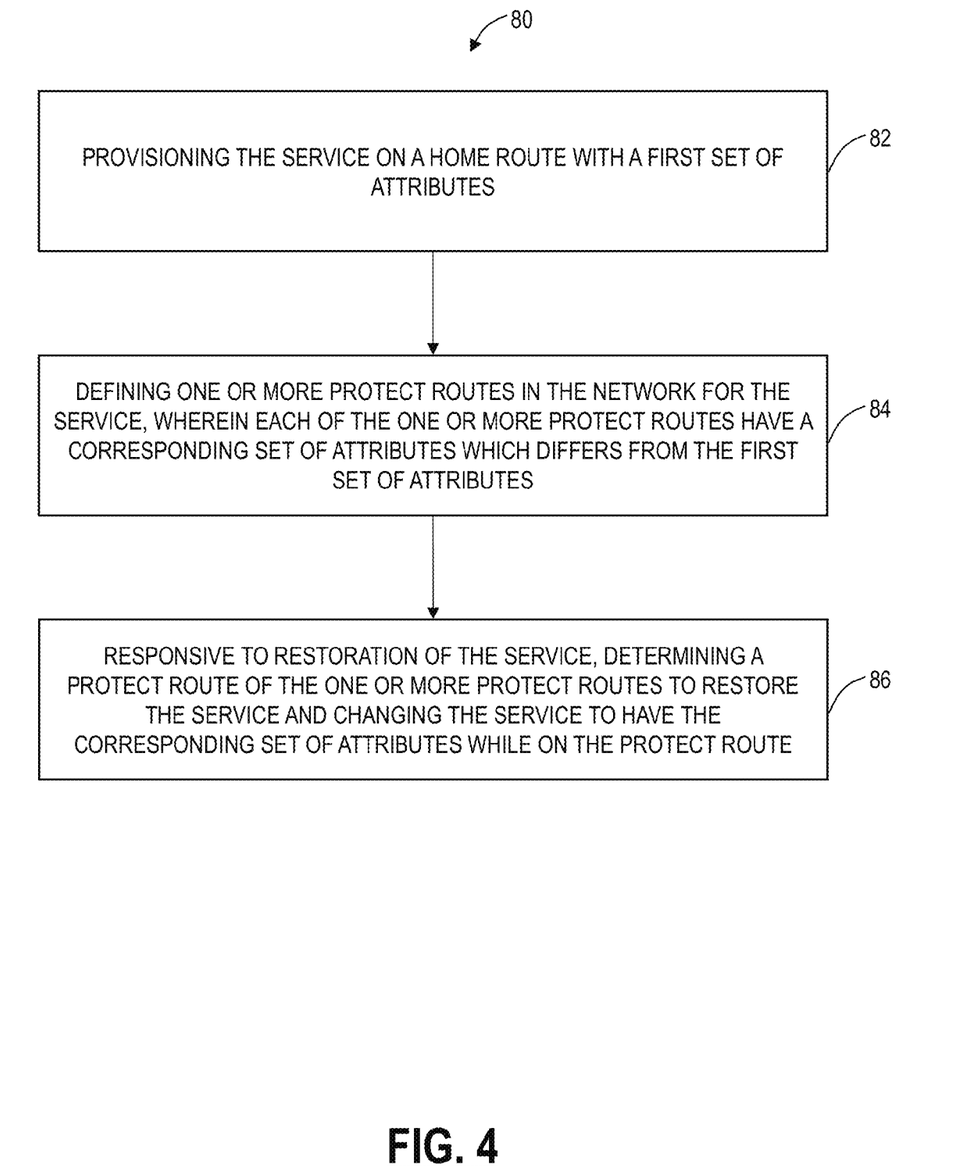
FIG. 4 is a flowchart of a process of flexible behavior modification of a service implemented in a node during restoration in an optical network.

Referring to FIG. 4, in an exemplary embodiment, a flowchart illustrates a process 80 of flexible behavior modification of a service implemented in a node during restoration in an optical network. The process 80 includes provisioning the service on a home route with a first set of attributes (step 82); defining one or more protect routes in the network for the service, wherein each of the one or more protect routes have a corresponding set of attributes which differs from the first set of attributes; and, responsive to restoration of the service, determining a protect route of the one or more protect routes to restore the service and changing the service to have the corresponding set of attributes while on the protect route. The first set of attributes are associated with the nominal path (i.e., the home route) and the one or more protect routes and their corresponding set of attributes may include additional and/or different attributes from the first set of attributes. Optionally, the service can be a Subnetwork Connection (SNC) and the home route and the one or more protect routes are defined by Designated Transit Lists (DTLs) provided by one or more of a user, a Network Management System (NMS), and a Software Defined Networking (SDN) application. Alternatively, the service can be a Labeled Switched Path (LSP) and the home route and the one or more protect routes are defined by Explicit Route Objects (EROS) provided by one or more of a user, a Network Management System (NMS), and a Software Defined Networking (SDN) application.

The determining can be based on a state of the service and the network at a time of the restoration. Optionally, the changing the service can alter attributes across an entire path of the protect route. Alternatively, the changing the service can alter attributes across one or more links of the protect route. In an exemplary embodiment, the service is a Layer 1 service, and the attributes include one or more of preemption priority, Optical Virtual Private Network (OVPN) domains, latency, administrative weight, a destination endpoint, and route diversity. In another exemplary embodiment, the service is a packet service, and the attributes include one or more of Multiprotocol Label Switching Transport Profile (MPLS-TP) Label Switched Path (LSP) attributes including size and priority. In a further exemplary embodiment, the service is an optical connection, and wherein the one or more attributes comprise one or more of a modulation format, a rate, and a spectral width for the optical connection. Various other attributes are also contemplated, such as a destination node, restoration behavior on failure, reversion behavior after the failure, and the like. The attributes can be anything specified in a call for the service.

In another exemplary embodiment, an apparatus adapted to perform flexible behavior modification of a service during restoration in an optical network includes circuitry adapted to provision the service on a home route with a first set of attributes; circuitry adapted to define one or more protect routes in the network for the service, wherein each of the one or more protect routes have a corresponding set of attributes which differs from the first set of attributes; and circuitry adapted to determine, responsive to restoration of the service, a protect route of the one or more protect routes to restore the service and adapted to change the service to have the corresponding set of attributes while on the protect route. In an exemplary embodiment, the apparatus can be the SDN controller 18 or an SDN application communicatively coupled to the SDN controller 18. In another exemplary embodiment, the circuitry can be the controller 50. In a further exemplary embodiment, the circuitry can be part of the common equipment 32.

Conventionally, DTLs/EROs define a path across the network 10 for SNCs/LSPs. A DTL currently includes a list of links 14 defining a route across the network 10. A SNC can have multiple DTL's for various functions such as the home route and protect routes. The SNC's DTL's can be provided by the user, NMS, and/or a SDN application. The SNC's originating network element 12 controls the SNC's route across the network 10 depending on the state of the SNC. During a SNC restoration action, the originating network element 12 will attempt to use defined protect DTL(s) (i.e., predefined restoration routes) to determine the protection route to restore the SNC. The systems and methods described herein allow the originating network element 12 to change the SNC's attributes during a restoration.

Attributes are added to the DTL/ERO allowing the originating network element to alter temporarily the behavior of the SNC based on the SNC state and route of the SNC. The SNC state determines which DTL(s) to be used. Once the SNC state is established, the DTL or list of DTL's will be attempted. If a list is provided, and the route identified by the first DTL in the list is unavailable, the next DTL in the list will be attempted. Each DTL in the list could redefine attributes to apply to the SNC. Nominally these attribute changes would increase the chance of the SNC to be restored within the network 10.

The protect DTL provided could change attributes based on the entire SNC path, and/or individual links in the SNC path. By changing attributes based on individual links, the SNC could limit the use of network resources for some links and allow the use for others to attempt to restore the SNC.

As an example, an SDN application could provide four protect DTL's to an originating network element for a high priority SNC. During a restoration action of the SNC, the originating network element will step down the protect DTL list attempting each route before moving to the next DTL.

The first two DTL's in the list may maintain the SNC priority as a high priority SNC. However, if the first two routes defined by the first two DTL's are unavailable, the network 10 could be assumed to be in a significantly degraded state (i.e., multiple failures). In this case, the third and fourth protect DTL's may lower the SNC priority, allowing it to be preempted in the case of network congestion due to the degraded state; thus allowing more important SNC's to be restored, while still attempting to keep this service available. Once the network returns to a normal state, the SNC can revert to the home route and restore the attributes to the normal values.

In the example, the SDN application provides the protect DTL's to the originating network element prior to the SNC restoration action. Alternatively, the SDN Application could provide the Protect DTL's to the originating network element during the restoration action based on live feedback from the state of the network 10. In this scenario, the protect DTL could change the behavior of multiple SNC's to restore efficiently services on the network 10.

SNC attribute changes by the Protect DTL during restoration could include preemption priority as in the example above, but could also include OVPN (Optical VPN) domains, maximum latency or admin weight limitations, route diversity considerations, and others. The systems and methods could also be applied to Packet Networks; for instance, MPLS-TP LSP attributes could be altered to allow restoration. These changes could include LSP size, priority, and others.

Designated Transit List (DTL)

Figure 5:
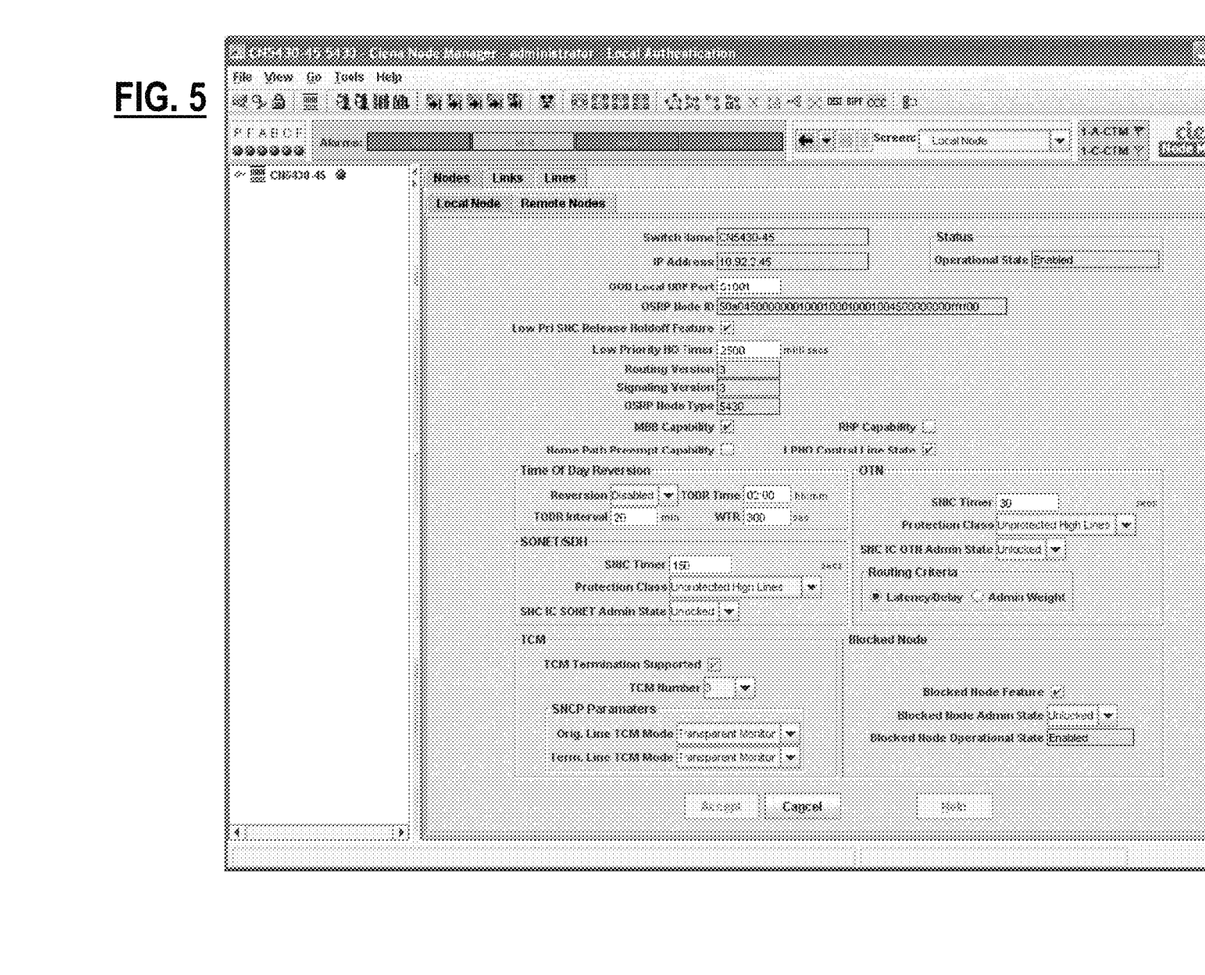
FIGS. 5, 6, and 7 are screen shots of Graphical User Interface (GUI) screens associated with provisioning Designated Transit Lists (DTLs) according to the systems and methods described herein.
Figure 6:
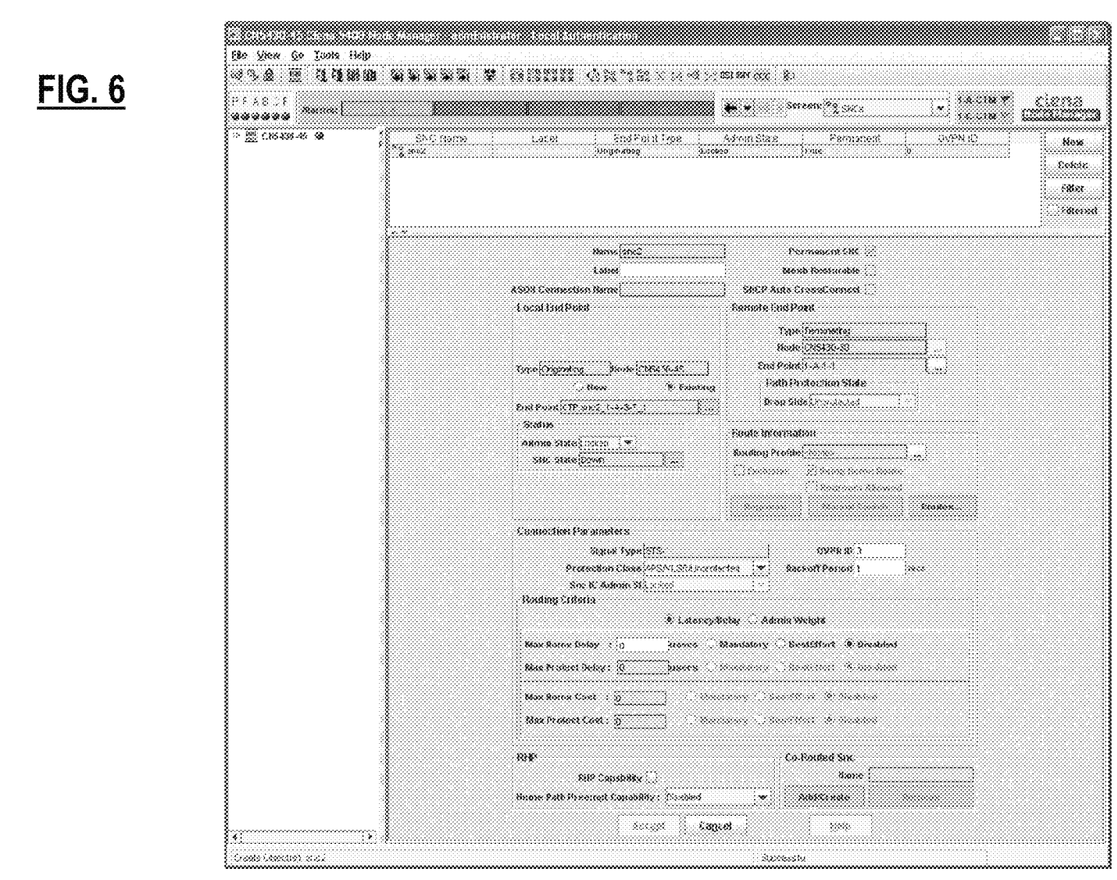
Figure 7:
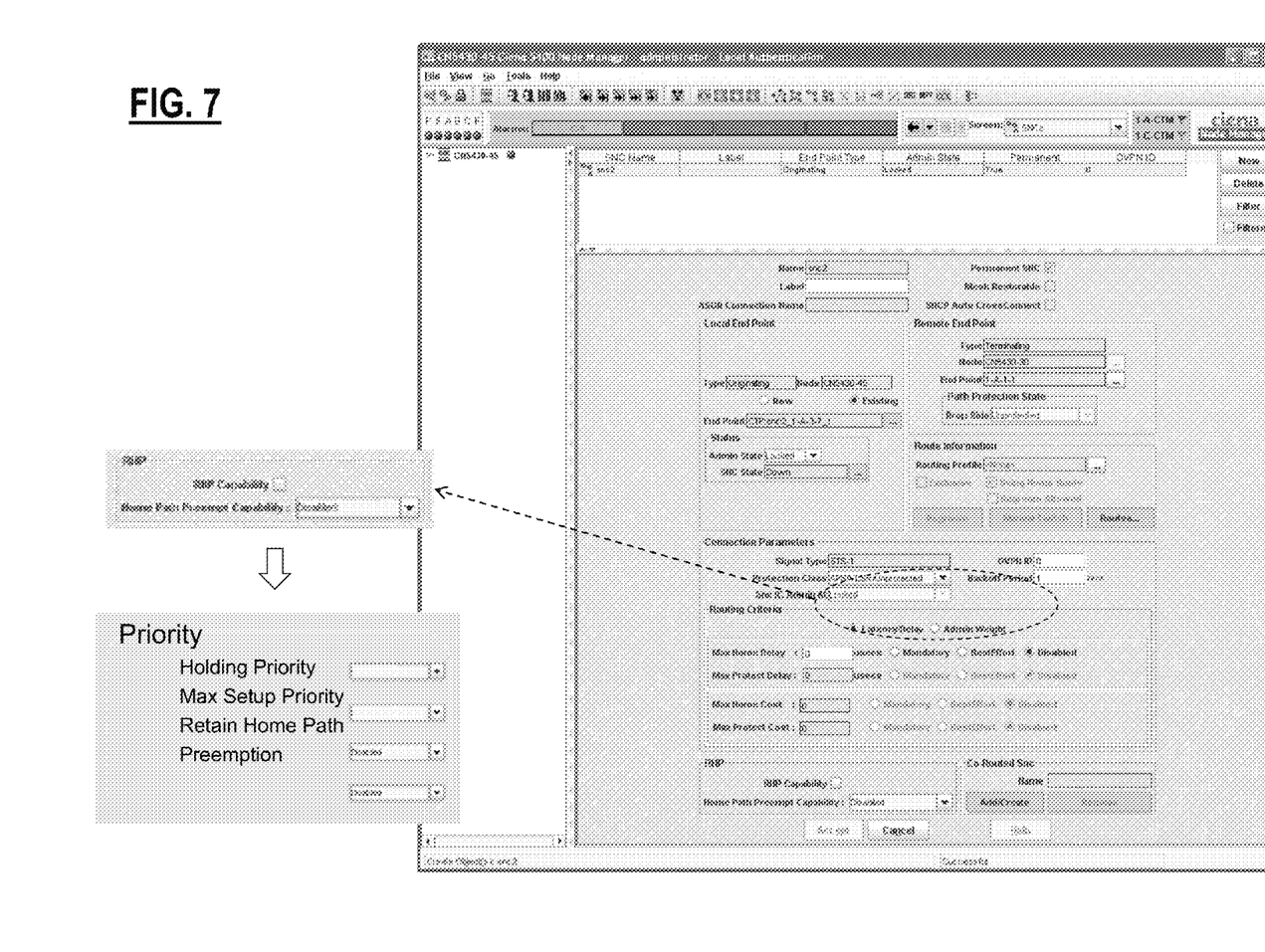

Referring to FIGS. 5, 6, and 7, in various exemplary embodiments, screen shots illustrate Graphical User Interface (GUI) screens associated with provisioning DTLs according to the systems and methods described herein. In an exemplary embodiment, DTLs can have a setup and holding priority to allow a SNC to change the configuration during use of the DTL. The DTL setup priority should list the setup priority to be applied by the SNC when the DTL is used. The DTL holding priority should provide the holding priority to be applied by the SNC when the DTL is used. Here, priority is an exemplary attribute. For a regroom, if a regroom action uses a DTL with a provisioned setup and holding priority, the DTL Priorities should be permanently applied to the SNC. If a regroom action uses a DTL without a provisioned setup and holding priority, the SNC priorities should be used for the action.

For Mesh Restoration (MR) or Manual Switch to Protect (MSP) using a DTL, if a MR or MSP action uses a DTL with a provisioned setup and holding priority, the DTL Priorities should be used for the action, but not permanently applied to the SNC. The SNC priorities should be used when reverting to the home path. If a MR or MSP action uses a DTL without a provisioned setup and holding priority, the SNC priorities should be used for the action.

FIG. 5 is a screen shot of node settings, for a service using Optical Transport Network (OTN) and selectable attributes such as Make Before Break (MBB), Retain Home Path (RHP), Home Path Preempt Capability, etc. FIG. 6 is an example of a first option of SNC provisioning with a Priority Class (Non-Preemptable, Holding Priority: 0, Highest Setup Priority: 0; Preemptable, Holding Priority: 3, Highest Setup Priority: 3; Extra Traffic—Preemptable, Holding Priority: 7, Highest Setup Priority: 7), Retain Home Path (enabled, disabled), Preemption (Disabled, Mesh Restoration Preemption of Reserved Home Paths, Mesh Restoration Preemption of Extra Traffic SNC's (Setup 3), Mesh Restoration Preemption of Preemptable and Extra Traffic SNC's (Setup 0)). FIG. 7 is an example of a second option of SNC provisioning with a Holding Priority (Integer ranging 0 through 7), Highest Setup Priorities (Integer ranging 0 through 7), Retain Home Path (enabled, disabled), Preemption (Mesh Restoration (Enabled), Disabled).

Optical Connection

In an exemplary embodiment, the service can include an optical connection, such as a wavelength, channel, etc. that is managed by the control plane and/or SDN. In an exemplary embodiment, the behavior modification can include changing wavelengths, modulation format, etc. Note, given the fact the length of a path a wavelength traverses attracts different optical impairments, the systems and methods can include allowing the control plane and/or SDN to indicate a given modulation format for a given path. For example, a short path with less impairments may be able to use a higher bandwidth modulation format such as 16-Quadrature Amplitude Modulation (16-QAM) where a longer path with more impairments may require a more tolerate modulation format such as Quadrature Phase Shift Keying (QPSK), four Amplitude Shift Keying (4ASK). Thus, modulation format may be one of the modifiable behavior characteristics leveraging next gen optical modem technology which supports software programmable modulation formats with a same set of hardware. Other attributes for optical connections can include Forward Error Correction (FEC) schemes, coding schemes, and the like.

Destination End Point Change

In a further exemplary embodiment, the systems and methods can include alteration of a destination end point as one of the behavior attributes. This can include changing the destination end point including the destination node. This would allow a lower level control plane to emulate a routing feature typically found somewhere like Virtual Router Redundancy Protocol (VRRP). This would allow a service, such as an SNC, to be completely rerouted from the originating point and change the end point using DTLs.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc.

each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of flexible behavior modification of a service implemented in a node during restoration in an optical network, the method comprising:
    provisioning the service on a home route with a first set of attributes;
    defining one or more protect routes in the network for the service each by one of an associated Designated Transit List (DTL) and an associated Explicit Route Object (ERO), wherein each of the one or more protect routes have a corresponding set of attributes added to the associated DTL or ERO and which differs from the first set of attributes; and
    responsive to restoration of the service, determining a protect route of the one or more protect routes to restore the service and changing the service to have the corresponding set of attributes while on the protect route.

2. The method of claim 1, wherein the service is a Subnetwork Connection (SNC) and the home route and the one or more protect routes are defined by Designated Transit Lists (DTLs) provided by one or more of a user, a Network Management System (NMS), and a Software Defined Networking (SDN) application.

3. The method of claim 1, wherein the service is a Labeled Switched Path (LSP) and the home route and the one or more protect routes are defined by Explicit Route Objects (EROS) provided by one or more of a user, a Network Management System (NMS), and a Software Defined Networking (SDN) application.

4. The method of claim 1, wherein the determining is based on a state of the service and the network at a time of the restoration.

5. The method of claim 1, wherein the changing the service alters attributes across an entire path of the protect route.

6. The method of claim 1, wherein the changing the service alters attributes across one or more links of the protect route.

7. The method of claim 1, wherein the service is a Layer 1 service, and wherein the attributes comprise one or more of preemption priority, Optical Virtual Private Network (OVPN) domains, latency, a destination endpoint, administrative weight, and route diversity.

8. The method of claim 1, wherein the service is a packet service, and wherein the attributes comprise one or more of Multiprotocol Label Switching Transport Profile (MPLS-TP) Label Switched Path (LSP) attributes comprising size and priority.

9. The method of claim 1, wherein the service is an optical connection, and wherein the one or more attributes comprise one or more of a modulation format, a rate, and a spectral width for the optical connection.

10. An apparatus adapted to perform flexible behavior modification of a service during restoration in an optical network, the apparatus comprising:
    circuitry adapted to provision the service on a home route with a first set of attributes;
    circuitry adapted to define one or more protect routes in the network for the service each by one of an associated Designated Transit List (DTL) and an associated Explicit Route Object (ERO), wherein each of the one or more protect routes have a corresponding set of attributes added to the associated DTL or ERO and which differs from the first set of attributes; and
    circuitry adapted to determine, responsive to restoration of the service, a protect route of the one or more protect routes to restore the service and adapted to change the service to have the corresponding set of attributes while on the protect route.

11. The apparatus of claim 10, wherein the service is a Subnetwork Connection (SNC) and the home route and the one or more protect routes are defined by Designated Transit Lists (DTLs) provided by one or more of a user, a Network Management System (NMS), and a Software Defined Networking (SDN) application.

12. The apparatus of claim 10, wherein the service is a Labeled Switched Path (LSP) and the home route and the one or more protect routes are defined by Explicit Route Objects (EROS) provided by one or more of a user, a Network Management System (NMS), and a Software Defined Networking (SDN) application.

13. The apparatus of claim 10, wherein the circuitry adapted to determine uses a state of the service and the network at a time of the restoration.

14. The apparatus of claim 10, wherein the change alters attributes across an entire path of the protect route.

15. The apparatus of claim 10, wherein the change alters attributes across one or more links of the protect route.

16. The apparatus of claim 10, wherein the service is a Layer 1 service, and wherein the attributes comprise one or more of preemption priority, Optical Virtual Private Network (OVPN) domains, latency, a destination endpoint, administrative weight, and route diversity.

17. The apparatus of claim 10, wherein the service is a packet service, and wherein the attributes comprise one or more of Multiprotocol Label Switching Transport Profile (MPLS-TP) Label Switched Path (LSP) attributes comprising size and priority.

18. The apparatus of claim 10, wherein the service is an optical connection, and wherein the one or more attributes comprise one or more of a modulation format, a rate, and a spectral width for the optical connection.

19. A node in an optical network adapted to perform flexible behavior modification of a service during restoration, the node comprising:
    one or more line ports adapted to ingress and egress a service; and
    a controller adapted to provision the service on a home route with a first set of attributes, define one or more protect routes in the network for the service each by one of an associated Designated Transit List (DTL) and an associated Explicit Route Object (ERO), wherein each of the one or more protect routes have a corresponding set of attributes added to the associated DTL or ERO and which differs from the first set of attributes, and responsive to restoration of the service, determine a protect route of the one or more protect routes to restore the service and change the service to have the corresponding set of attributes while on the protect route.

20. The node of claim 19, wherein the controller is adapted to determine and use a state of the service and the network at a time of the restoration.

\* \* \* \* \*